United States Patent
Liu et al.

(10) Patent No.: US 11,431,186 B2
(45) Date of Patent: Aug. 30, 2022

(54) SYSTEMS AND METHODS FOR COMPENSATING FOR BATTERY CHARGING PATH RESISTIVE LOSSES

(71) Applicant: Dell Products L.P., Round Rock, TX (US)

(72) Inventors: Chin-Jui Liu, Luzhu (TW); Merle J. Wood, Round Rock, TX (US); Adolfo S. Montero, Pflugerville, TX (US); Yu-Chi Chin, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 166 days.

(21) Appl. No.: 16/857,484

(22) Filed: Apr. 24, 2020

(65) Prior Publication Data
US 2021/0336466 A1    Oct. 28, 2021

(51) Int. Cl.
*H02J 7/00*    (2006.01)

(52) U.S. Cl.
CPC ...... *H02J 7/007182* (2020.01); *H02J 7/0047* (2013.01)

(58) Field of Classification Search
None
See application file for complete search history.

(56) References Cited

U.S. PATENT DOCUMENTS

2009/0295349 A1 * 12/2009 Tao ................. H02M 3/33507
                                                        323/282
2018/0145527 A1 *  5/2018 Ravi ................... H02J 7/0045

* cited by examiner

*Primary Examiner* — Arun C Williams
(74) *Attorney, Agent, or Firm* — Jackson Walker L.L.P.

(57) ABSTRACT

A method may include, in a management controller of an information handling system including a power system configured to provide electrical energy to information handling resources of the information handling system, the power system having a direct-current input power source, a rechargeable energy storage device coupled to and rechargeable from the direct-current input power source, and a charger configured to control recharging of the rechargeable energy storage device from the direct-current input power source: retrieving parameters from one or more registers associated with the rechargeable energy storage device, the parameters including a desired voltage across terminals of the rechargeable energy storage device and a desired current for recharging the rechargeable energy storage device during a constant current mode of a charging cycle of the rechargeable energy storage device and communicating the parameters to the charger such that the charger controls recharging of the rechargeable energy storage device in accordance with the parameters retrieved from the one or more registers.

15 Claims, 2 Drawing Sheets

SYSTEMS AND METHODS FOR COMPENSATING FOR BATTERY CHARGING PATH RESISTIVE LOSSES

TECHNICAL FIELD

The present disclosure relates in general to information handling systems, and more particularly compensating for battery charging path resistive losses.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In many computing applications, an information handling system may include a rechargeable battery or other energy storage device that may serve as an energy source to power components of the information handling system in the event that a "main" power source (e.g., an alternating current power source or a direct current power source adapted from an alternating current power source) is removed or otherwise withdrawn from the information handling system. When the main power source is present, a battery may be configured to recharge from the main power source using a charger that may selectively open or close a conductive path between the main power source and the battery.

In a typical power system, there may exist multiple resistive losses along a path from a charger output to battery cells of a battery. In existing implementations, a charger's voltage output feedback loop may be programmed for the maximum cell voltage specification, without taking into account resistive losses along the charging path which become much more pronounced with increasing battery charge rates. In many instances, it may be inefficient to measure and track all of the parasitic losses in the charging path in order to derive a modeling formula to adjust the output voltage accordingly.

The result of these parasitic losses is a lower voltage than maximum allowed at the battery terminals, which may result in longer charging times which may counteract the benefits of increased charging rates. This problem of resistive losses in the charging path may become more pronounced with increased battery charging currents.

SUMMARY

In accordance with the teachings of the present disclosure, the disadvantages and problems associated with existing approaches to charging a battery may be reduced or eliminated.

In accordance with embodiments of the present disclosure, an information handling system may include a processor, a power system configured to provide electrical energy to information handling resources of the information handling system, and a management controller communicatively coupled to a power system. The power system may include a direct-current input power source, a rechargeable energy storage device coupled to and rechargeable from the direct-current input power source, and a charger configured to control recharging of the rechargeable energy storage device from the direct-current input power source. The management controller may be configured to retrieve parameters from one or more registers associated with the rechargeable energy storage device, the parameters including a desired voltage across terminals of the rechargeable energy storage device and a desired current for recharging the rechargeable energy storage device during a constant current mode of a charging cycle of the rechargeable energy storage device and communicate the parameters to the charger such that the charger controls recharging of the rechargeable energy storage device in accordance with the parameters retrieved from the one or more registers.

In accordance with these and other embodiments of the present disclosure, a method may include, in a management controller of an information handling system including a power system configured to provide electrical energy to information handling resources of the information handling system, the power system having a direct-current input power source, a rechargeable energy storage device coupled to and rechargeable from the direct-current input power source, and a charger configured to control recharging of the rechargeable energy storage device from the direct-current input power source: retrieving parameters from one or more registers associated with the rechargeable energy storage device, the parameters including a desired voltage across terminals of the rechargeable energy storage device and a desired current for recharging the rechargeable energy storage device during a constant current mode of a charging cycle of the rechargeable energy storage device and communicating the parameters to the charger such that the charger controls recharging of the rechargeable energy storage device in accordance with the parameters retrieved from the one or more registers.

In accordance with these and other embodiments of the present disclosure, an article of manufacture may include a non-transitory computer-readable medium and computer-executable instructions carried on the computer-readable medium, the instructions readable by a management controller of an information handling system including a power system configured to provide electrical energy to information handling resources of the information handling system, the power system having a direct-current input power source, a rechargeable energy storage device coupled to and rechargeable from the direct-current input power source, and a charger configured to control recharging of the rechargeable energy storage device from the direct-current input power source, the instructions, when read and executed, for causing the management controller to: retrieve parameters from one or more registers associated with the rechargeable energy storage device, the parameters including a desired voltage across terminals of the rechargeable energy storage device and a desired current for recharging the rechargeable energy storage device during a constant current mode of a charging cycle of the rechargeable energy storage device and communicate the parameters to the charger such that the charger controls recharging of the rechargeable energy storage device in accordance with the parameters retrieved from the one or more registers.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
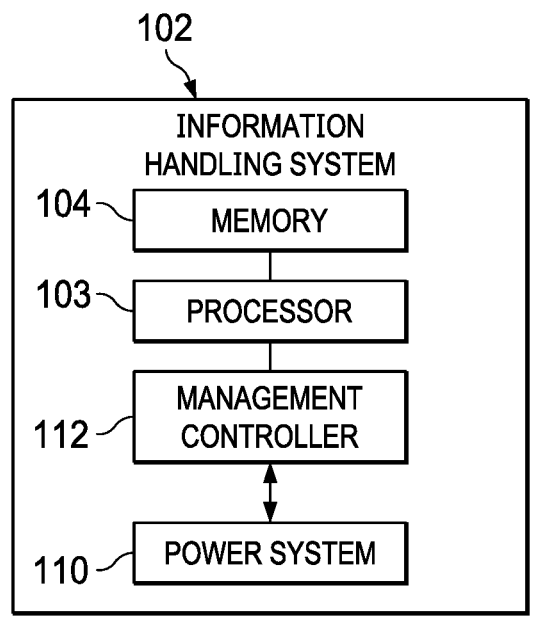
FIG. 1 illustrates a block diagram of an example information handling system, in accordance with embodiments of the present disclosure.
Figure 2:
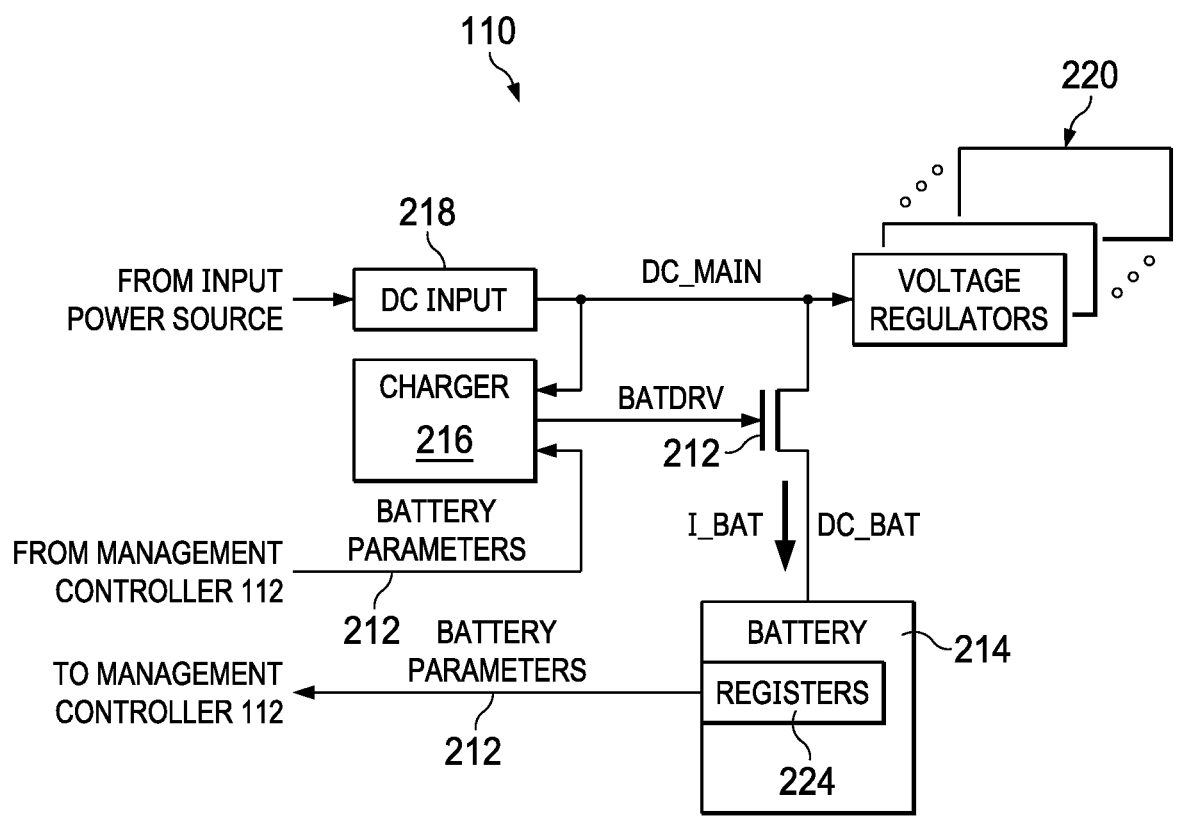
FIG. 2 illustrates a block diagram of an example power system, in accordance with embodiments of the present disclosure.
Figure 3:
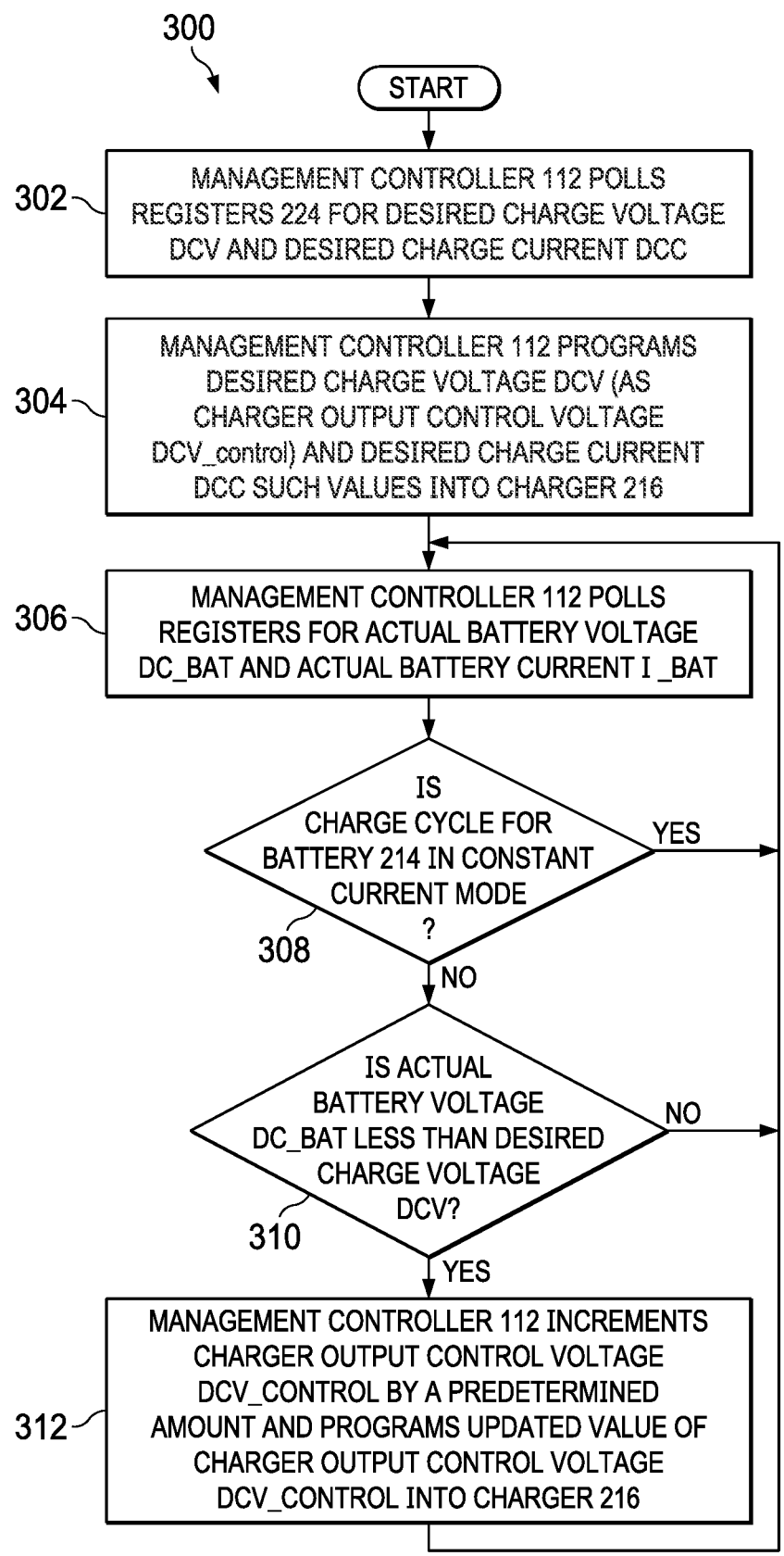
FIG. 3 illustrates a flow chart of an example method for compensating for charging path resistive losses, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input and output ("I/O") devices, such as a keyboard, a mouse, and a video display. The information handling system may also include one or more buses operable to transmit communication between the various hardware components.

For the purposes of this disclosure, information handling resources may broadly refer to any component system, device or apparatus of an information handling system, including without limitation processors, buses, memories, input-output devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory ("RAM"), read-only memory ("ROM"), electrically erasable programmable read-only memory ("EEPROM"), and/or flash memory; as well as communications media such as wires, optical fibers, microwaves, radio waves, and other electromagnetic and/or optical carriers; and/or any combination of the foregoing.

FIG. 1 illustrates a block diagram of an example information handling system 102, in accordance with embodiments of the present disclosure. In some embodiments, an information handling system 102 may comprise a server. In these and other embodiments, an information handling system 102 may comprise a personal computer. In other embodiments, an information handling system 102 may be a portable computing device (e.g., a laptop, notebook, tablet, handheld, smart phone, personal digital assistant, etc.). As depicted in FIG. 1, an information handling system 102 may include a processor 103, a memory 104 communicatively coupled to processor 103, a management controller 112 communicatively coupled to processor 103, and a power system 110.

A processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

A memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

Management controller 112 may be configured to provide management facilities for management of information handling system 102. Such management may be made by management controller 112 even if information handling system 102 is powered off or powered to a standby state. Management controller 112 may include a processor, a memory, and/or other components. In certain embodiments, management controller 112 may include or may be an integral part of an embedded controller (EC), baseboard management controller (BMC), or a remote access controller (e.g., a Dell Remote Access Controller or Integrated Dell Remote Access Controller).

Generally speaking, power system 110 may include any system, device, or apparatus configured to supply electrical current to one or more information handling resources of information handling system 102. For example, power system 110 may include any system, device, and/or apparatus operable to supply direct current (DC) electrical power to one or more information handling resources.

In addition to processor 103, memory 104, management controller 112, and power system 110, information handling system 102 may include one or more other information handling resources.

FIG. 2 illustrates a block diagram of an example power system 110, in accordance with embodiments of the present disclosure. As shown in FIG. 2, power system 110 may include direct current (DC) input 218, charger 216, battery 214, switch 212, and one or more voltage regulators 220.

DC input 218 may include any system, device, or apparatus configured to couple an alternating-current-to-direct-current (AC/DC) adapter (or a device emulating such adapter) to information handling system 102 such that the AC/DC adapter (or the device emulating such adapter) may deliver electrical energy to power system 110 for powering information handling resources of information handling system 102 and/or recharging battery 214. As shown in FIG. 2, DC input 218 may generate a main DC voltage DC_MAIN to other components of power system 110.

Battery 214 may comprise any system, device, or apparatus comprising one or more electrochemical cells that convert stored chemical energy into electrical energy for delivery to information handling resources of information handling system 102, as well as recharge in response to electric current delivered to battery 214, which may reverse the chemical reactions that occur during conversion of the stored chemical energy into electrical energy. As shown in FIG. 2, battery 214 may include one or more memory registers 224 for storing battery parameters. For example, registers 224 may store a desired charge voltage DCV for battery 214, a desired charge current DCC for battery 214, an actual battery voltage DC_BAT for battery 214, an actual battery current I_BAT for battery 214, and/or other parameters. In some embodiments, registers 224 may comprise registers integral to or associated with a battery management unit of battery 214.

Charger 216 may include any system, device, or apparatus configured to control switch 212 to control a flow of charge from main voltage DC_MAIN to battery 214 in order to charge battery 214. For example, charger 216 may be configured to receive an indication of battery parameters (e.g., desired charging levels, state of charge of battery 214, etc.) from management controller 112, and based thereon, generate a signal BATDRV for controlling an impedance of switch 212 to deliver a desired voltage and/or current from DC input 218 to battery 214 to charge battery 214.

Switch 212 may comprise any system, device, or apparatus having a controllable impedance based on a driving signal BATDRV received at a control input (e.g., a gate terminal) of switch 212. In some embodiments, switch 212 may comprise a transistor, for example a metal-oxide-semiconductor field-effect transistor.

A voltage regulator 220 may include any system, device, or apparatus configured to generate a regulated voltage, which may be the same or different from main voltage DC_MAIN, to one or more information handling resources of information handling system 102.

In existing approaches, a maximum output voltage of charger 216 may be configured by management controller 112 according to a desired charging voltage DCV for battery 214. Parasitic losses in interconnect, cabling, and/or other conductive paths between switch 212 and battery 214 may cause a requested battery voltage different than actual battery voltage DC_BAT present at terminals of battery 214.

To overcome this problem, in operation, management controller 112 may interact with registers 224 to determine a maximum voltage rating of battery cells of battery 214, which maximum voltage rating may represent desired charging voltage DCV for battery 214. In addition, management controller 112 may interact with registers 224 to determine a maximum charging rate for battery cells of battery 214, which maximum voltage rating may represent desired charging current DCC for battery 214. Initial control of charger 216 by management controller 112 (and in turn, control of switch 212 by charger 216) may use these values for desired charging voltage DCV and desired charging current DCC.

As circuitry of charger 216, switch 212, and battery 214 are exposed to the programmed settings for desired charging voltage DCV and desired charging current DCC, battery 214 may update readings of actual battery voltage DC_BAT and actual battery current I_BAT.

During a "constant current" portion of a charging cycle for battery 214, the voltage feedback loop implemented by management controller 112 may be limited by a current limit feedback loop rather than a voltage limit feedback loop. Thus, as soon as management controller 112 is able to determine that actual battery current I_BAT has decreased from desired charging current DCC, the charge cycle will have transitioned to a "constant voltage" portion, and at this point it may be critical to maintain desired charging voltage DCV at battery terminals of battery 214.

During this constant voltage portion of the charge cycle, management controller 112 may monitor the actual battery voltage DC_BAT from registers 224 (e.g., via an Inter-Integrated Circuit (I2C) polling loop) and may adjust a charger output control voltage DCV_control in increments (e.g., increments of 0.1V) until the battery terminals of battery 214 reach desired charging voltage DCV. Such adjustment of charger output control voltage DCV_control may automatically compensate for any parasitic impedance losses in the charging path between DC_MAIN and battery 214. As actual battery current I_BAT decreases, the parasitic impedance losses may also decrease, and thus management controller 112 may also decrease charger output control voltage DCV_control in increments (e.g., in increments of 0.1V) until battery terminals of battery 214 are approximately equal to desired charging voltage DCV. As battery current I_BAT decreases to zero, so too will parasitic voltage drops. Thus, at the end of the charge cycle, the parasitic impedance losses may be low enough that the output at the bottom terminal of switch 212 in FIG. 2 may finally stabilize approximately at desired charging voltage DCV.

One example advantage of using this approach is it may not require additional hardware, in that only revisions to existing firmware implementations of management controllers may be needed.

FIG. 3 illustrates a flow chart of an example method 300 for compensating for charging path resistive losses, in accordance with embodiments of the present disclosure. According to some embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, management controller 112 may (e.g., after a powering on or reset of management controller 112), poll (e.g., via an I2C interface) registers 224 for desired charge voltage DCV and desired charge current DCC. At step 304, management controller 112 may program such values into charger 216 (e.g., setting charger output control voltage DCV_control equal to desired charge voltage DCV) such that charger 216 drives switch 212 to charge battery 214 in accordance with values for desired charge voltage DCV and desired charge current DCC.

At step 306, management controller 112 may poll registers for actual battery voltage DC_BAT and actual battery current I_BAT. At step 308, management controller 112 may determine if the charge cycle for battery 214 is in its constant current mode. For example, the constant current mode may exist if an actual charging current is at desired charge current DCC and an actual charging voltage is below desired charge voltage DCV. If the charge cycle for battery 214 is in its constant current mode, method 300 may proceed again to step 306. Otherwise, method 300 may proceed again to step 310.

At step 310, management controller 112 may determine if actual battery voltage DC_BAT is less than desired charge voltage DCV. If actual battery voltage DC_BAT is less than desired charge voltage DCV, management controller 112 may proceed to step 312. Otherwise, method 300 may proceed again to step 306.

At step 312, management controller 112 may increment charger output control voltage DCV_control by a predetermined amount (e.g., 0.1 V), and program the updated value for charger output control voltage DCV_control into charger 216, thus compensating for any parasitic impedance-induced voltage drop. After completion of step 312, method 300 may proceed again to step 306, and steps 306-312 may repeat until increment charger output control voltage DCV_control reaches a level that fully (at least in an approximate sense) compensates for any parasitic impedance-induced voltage drop at the terminals of battery 214.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a processor;
   a power system configured to provide electrical energy to information handling resources of the information handling system, the power system comprising:
      a direct-current input power source;
      a rechargeable energy storage device coupled to and rechargeable from the direct-current input power source; and
      a charger configured to control recharging of the rechargeable energy storage device from the direct-current input power source; and
   a management controller communicatively coupled to the power system and configured to:
      retrieve parameters from one or more registers associated with the rechargeable energy storage device, the parameters including a desired voltage across terminals of the rechargeable energy storage device, a desired current for recharging the rechargeable energy storage device during a constant current mode of a charging cycle of the rechargeable energy storage device, and a measured voltage at the terminals of the rechargeable energy storage device;

communicate the parameters to the charger such that the charger controls recharging of the rechargeable energy storage device in accordance with the parameters retrieved from the one or more registers; and compensate for impedance losses of a charging path between the charger and the rechargeable energy storage device based on the measured voltage.

2. The information handling system of claim 1, wherein the management controller is further configured to compensate for impedance losses by incrementing, in a constant voltage mode of a charging cycle of the rechargeable energy storage device, an offset between a compensation voltage and the desired voltage, wherein the management controller communicates the compensation voltage to the charger to control recharging of the rechargeable energy storage device.

3. The information handling system of claim 1, wherein the rechargeable energy storage device comprises a rechargeable battery.

4. The information handling system of claim 3, wherein the one or more registers are associated with a battery management unit of the rechargeable battery.

5. The information handling system of claim 1, wherein the management controller retrieves the parameters from the one or more registers via an Inter-Integrated Circuit interface.

6. A method comprising, in a management controller of an information handling system including a power system configured to provide electrical energy to information handling resources of the information handling system, the power system having a direct-current input power source, a rechargeable energy storage device coupled to and rechargeable from the direct-current input power source, and a charger configured to control recharging of the rechargeable energy storage device from the direct-current input power source:

retrieving parameters from one or more registers associated with the rechargeable energy storage device, the parameters including a desired voltage across terminals of the rechargeable energy storage device, a desired current for recharging the rechargeable energy storage device during a constant current mode of a charging cycle of the rechargeable energy storage device, and a measured voltage at the terminals of the rechargeable energy storage device;

communicating the parameters to the charger such that the charger controls recharging of the rechargeable energy storage device in accordance with the parameters retrieved from the one or more registers; and compensating for impedance losses of a charging path between the charger and the rechargeable energy storage device based on the measured voltage.

7. The method of claim 6, further comprising compensating for impedance losses by incrementing, in a constant voltage mode of a charging cycle of the rechargeable energy storage device, an offset between a compensation voltage and the desired voltage, wherein the management controller communicates the compensation voltage to the charger to control recharging of the rechargeable energy storage device.

8. The method of claim 6, wherein the rechargeable energy storage device comprises a rechargeable battery.

9. The method of claim 8, wherein the one or more registers are associated with a battery management unit of the rechargeable battery.

10. The method of claim 6, further comprising retrieving the parameters from the one or more registers via an Inter-Integrated Circuit interface.

11. An article of manufacture comprising:

a non-transitory computer-readable medium; and computer-executable instructions carried on the computer-readable medium, the instructions readable by a management controller of an information handling system including a power system configured to provide electrical energy to information handling resources of the information handling system, the power system having a direct-current input power source, a rechargeable energy storage device coupled to and rechargeable from the direct-current input power source, and a charger configured to control recharging of the rechargeable energy storage device from the direct-current input power source, the instructions, when read and executed, for causing the management controller to:

retrieve parameters from one or more registers associated with the rechargeable energy storage device, the parameters including a desired voltage across terminals of the rechargeable energy storage device, a desired current for recharging the rechargeable energy storage device during a constant current mode of a charging cycle of the rechargeable energy storage device, and a measured voltage at the terminals of the rechargeable energy storage device;

communicate the parameters to the charger such that the charger controls recharging of the rechargeable energy storage device in accordance with the parameters retrieved from the one or more registers; and compensate for impedance losses of a charging path between the charger and the rechargeable energy storage device based on the measured voltage.

12. The article of claim 11, the instructions for further causing the management controller to compensate for impedance losses by incrementing, in a constant voltage mode of a charging cycle of the rechargeable energy storage device, an offset between a compensation voltage and the desired voltage, wherein the management controller communicates the compensation voltage to the charger to control recharging of the rechargeable energy storage device.

13. The article of claim 11, wherein the rechargeable energy storage device comprises a rechargeable battery.

14. The article of claim 13, wherein the one or more registers are associated with a battery management unit of the rechargeable battery.

15. The article of claim 11, the instructions for further causing the management controller to retrieve the parameters from the one or more registers via an Inter-Integrated Circuit interface.

\* \* \* \* \*